US010045307B2

(12) United States Patent
Awad et al.

(10) Patent No.: US 10,045,307 B2
(45) Date of Patent: Aug. 7, 2018

(54) COMMUNICATION SYSTEM FOR SETTING AN UPLINK TARGET RECEIVED POWER FOR A HOME BASE STATION (71) Applicant: NEC Corporation, Minato-ku, Tokyo (JP)

(72) Inventors: Yassin Aden Awad, Uxbridge (GB); Chadi Khirallah, Leatherhead (GB); Robert Arnott, London (GB); Motoki Morita, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/512,889

(22) PCT Filed: Sep. 17, 2015

(86) PCT No.: PCT/JP2015/004765
§ 371 (c)(1),
(2) Date: Mar. 21, 2017

(87) PCT Pub. No.: WO2016/051712
PCT Pub. Date: Apr. 7, 2016

(65) Prior Publication Data
US 2017/0303207 A1  Oct. 19, 2017

(30) Foreign Application Priority Data
Sep. 30, 2014  (GB) .................................. 1417245.6

(51) Int. Cl.
H04W 52/24  (2009.01)
H04W 52/14  (2009.01)
H04W 52/34  (2009.01)

(52) U.S. Cl.
CPC ........ H04W 52/244 (2013.01); H04W 52/146 (2013.01); H04W 52/343 (2013.01)

(58) Field of Classification Search
CPC ............. H04W 84/045; H04W 52/244; H04W 72/082; H04W 16/32; H04W 16/16;
(Continued)

(56) References Cited

U.S. PATENT DOCUMENTS

2010/0035617 A1* 2/2010 Whinnett ............ H04W 88/182
455/436
2011/0086665 A1  4/2011 Nakamura
(Continued)

FOREIGN PATENT DOCUMENTS

EP         2693667 A1    2/2014
JP      2012-507921 A    3/2012
(Continued)

OTHER PUBLICATIONS

The Broadband Forum, Technical Report 069 (TR-069), CPE WAN Management Protocol, Issue 1 Amendment 5, Nov. 11, 2013, CWMP Version 1.4, pp. 1-228.
(Continued)

Primary Examiner — Keith Ferguson (57) ABSTRACT

A communication system is disclosed in which a home base station operates a home cell and a macro base station operates a macro cell. The home base operates a cell located at least partially within the macro cell. The home base station can obtain information identifying a quantity of home base stations that each operate at least one respective cell that is located at least partially within the macro cell and from this information, and further information identifying resource usage via said home base station, can set a target power for said home base station.

16 Claims, 8 Drawing Sheets (58) Field of Classification Search
CPC . H04W 52/146; H04W 16/14; H04W 72/085; H04W 52/241; H04W 72/0473; H04W 52/18; H04W 28/048; H04W 52/0206; H04W 72/0413; H04W 36/20; H04W 52/04; H04W 36/0061
USPC ...... 455/522, 69, 500, 517, 444, 422.1, 403, 455/561, 550.1, 67.11, 426.1, 426.2, 507, 455/509, 450, 508, 445, 453, 515; 370/310, 318, 328, 329, 252
See application file for complete search history.

(56) References Cited

U.S. PATENT DOCUMENTS

| | | | |
|---|---|---|---|
| 2011/0189999 A1* | 8/2011 | Mueck | H04W 72/08 455/450 |
| 2011/0201339 A1 | 8/2011 | Kuningas | |
| 2013/0157680 A1 | 6/2013 | Morita et al. | |
| 2014/0073343 A1 | 3/2014 | Nagaraja et al. | |
| 2015/0004975 A1* | 1/2015 | Yamamoto | H04W 36/30 455/436 |

FOREIGN PATENT DOCUMENTS

| | | |
|---|---|---|
| WO | 2011/038777 A1 | 4/2011 |
| WO | 2012/042730 A1 | 4/2012 |
| WO | 2013/108315 A1 | 7/2013 |

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12), 3GPP TS 36.423, V12.3.0 (Sep. 2014).

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331, V12.3.0 (Sep. 2014).

International Search Report for PCT Application No. PCT/JP2015/004765, dated Dec. 4, 2015.

Written Opinion of the International Search Authority for PCT Application No. PCT/JP2015/004765.

Japanese Office Action for JP Application No. 2017-514373 dated Feb. 7, 2018 with English Translation.

* cited by examiner

COMMUNICATION SYSTEM FOR SETTING AN UPLINK TARGET RECEIVED POWER FOR A HOME BASE STATION

TECHNICAL FIELD

The present invention relates to mobile communications devices and networks, particularly but not exclusively those operating according to the $3^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

In recent times there has been an increasing demand for indoor high-speed mobile communication and the increasing deployment of small-sized, localised, cells, often referred to as 'femtocells' or 'pico-cells', operated by base stations that use a low transmission power is seen one of the inevitable consequences of this trend. Very small-sized cells, such as femtocells, are generally deployed in a home or small office/home office (SOHO) environment with the intention of enhancing capacity of the wider cellular system (e.g. in the manner of a 'hotspot') and/or of compensating for a coverage hole in a larger conventional cell or 'macro' cell (e.g. at the cell edge).

In long-term evolution (LTE) or LTE-Advanced, a base station that operates a small cell such as a femtocell or the like is often referred to as a 'home' base station, home eNodeB (HeNB), low power node (LPN), pico base station, or femto base station. A base station that operates a larger conventional cell is often referred to, in LTE, as a macro base station or Macro eNodeB (MeNB). For the purposes of this document the terms 'macro base station' and 'home base station' will generally be used.

Where there is an overlap of coverage between them interference between a small cell and the larger macro cell (or between a small cell other small cells) can be a major problem, especially where there is a dense deployment of small cells. This is because small cells are often closed cells and the home base station operating the small cell often shares a common channel with the base stations, such as the macro base station, operating other cells. The uplink (UL) interference from a small cell to a large cell can be a significant contributor to such interference. Thus, communication throughput in a macro cell can be reduced undesirably.

To help mitigate UL interference, it is known for the home base stations that operate small cells to employ UL power control in which the UL transmit power of mobile terminals and/or other UEs communicating via the small cells (home UEs/'HUEs') is controlled adaptively (e.g. in UL data and control channels such as the Physical Uplink Shared Channel, 'PUSCH' and Physical Uplink Control Channel, 'PUCCH').

In many cases, the parameters of UL power control such as the maximum allowed UE transmit power and/or the target received power (user or cell specific) are optimized on the basis of the path loss from the home base station or from a communication device in the small cell ('small cell UE') to the macro base station. The path loss is estimated by the difference between the transmit power of the macro base station and the received power at the home base station or UE. However, in this path loss based method, the UL interference from only a single small cell can be considered. Therefore, as the number of small cells increases, the UL interference is also increased resulting ultimately in a significant degradation of the UL throughput in the macro cell.

More recently, a proposal was made for a 'centralised' UL power control method in which the target received power for home base stations is adaptively set based on an aggregated resource usage for all small cells in a macro cell. In this more recent proposal a centralised UL power control algorithm (using a Home eNodeB Management System, 'HeMS') an algorithm was defined that used the aggregated UL resource usage (physical resource block, 'PRB', usage) of all home base stations in a particular macro cell to reduce interference of the home base stations to a macro base station. Where aggregate resource usage was large, the target received power of all home base stations was reduced by reducing the transmit power of all user equipment within the small cell of the home base stations with the intention of reducing overall interference towards the macro base station. Where aggregate resource usage was small, the target received power of all home base stations was increased by increasing transmit power of all user equipment within the small cell of the home base stations with the intention of improving throughput of home base station users.

In this way, therefore, it was expected that UL interference between the small cells, and the larger macro cell, could effectively be suppressed, regardless of the traffic load in the small cell, while the UL transmit power for the small cells could be maximized.

SUMMARY OF INVENTION

Technical Problem

There are, however, a number of potential issues associated with the centralised UL power control method. Firstly, for example, the method has the potential for significantly high signalling traffic between the home base stations and the HeMS because the home base stations have to report their UL PRB usage to the HeMS and because the HeMS has to report the aggregate UL PRB usage to all home base stations to allow each home base station to determine what their target received power should be and to control the transmit power of all user equipment within the small cell of that home base station.

Further, the centralised UL power control method requires complex synchronisation between the home base stations and the HeMS: firstly because all the home base stations have to synchronise their measurement periods (e.g. using a synchronised global system time maintained on an "internal timing clock" at each home base station); and secondly because the HeMS has to synchronise the process of aggregate UL PRB usage calculation with the UL PRB measurements of the home base stations and the UL PRB reporting timers.

Moreover, the centralised UL power control method requires support for extended signalling and new vendor specific parameters under appropriate broadband network specifications (e.g. under Technical Report 069, 'TR-069') of the Broadband Forum (also known as the DSL Forum). Such support may not always be guaranteed, especially if the HeMS is provided by a third party.

Still further, the centralised UL power control method can result in an inherent unfairness between different home base stations because all home base stations are affected equally regardless of the respective level of interference that each home base station causes to the macro base station.

The invention therefore aims to provide a mobile communication system, a mobile communication device, a communication node and associated methods which overcome or at least mitigates the above issues.

Solution to Problem

According to one aspect there is provided a home base station for a communication system in which a macro base station operates a macro cell, the home base station comprising: means for operating a cell located at least partially within the macro cell; means for obtaining information identifying a quantity of home base stations that each operate at least one respective cell that is located at least partially within the macro cell; means for determining resource usage via said home base station; means for setting a target power for said home base station based on said information identifying a quantity of home base stations and said determined resource usage; and means for communicating said target power set for said home base station to at least one user communication device.

According to one aspect there is provided a base station for a communication system, the base station comprising: means for operating a cell in which at least one cell operated by at least one home base station is located at least partially; and means for providing, to said at least one home base station, information identifying a quantity of home base stations that each operate at least one respective cell that is located at least partially within the macro cell to facilitate setting of a target power by said at least one home base station based on said information identifying a quantity of home base stations and a resource usage via said at least one home base station.

According to one aspect there is provided a communication device for a communication system in which a macro base station operates a macro cell in which at least one cell operated by at least one home base station is located at least partially, the communication device comprising: means for communicating with other communication devices via said at least one cell, operated by said at least one home base station; and means for setting a transmission power of said communication device, responsive to receipt from said at least one home base station of information identifying a target power, whereby to meet said received target power, wherein said information identifying a target power received from said at least one home base station identifies a target power that is based on information identifying a quantity of home base stations operating a cell that is located at least partially in said macro cell and on resource usage via said at least one home base station from which said target power is received.

According to one aspect there is provided a method performed by a home base station in a communication system in which a macro base station operates a macro cell, the method comprising: operating a cell located at least partially within the macro cell; obtaining information identifying a quantity of home base stations that each operate at least one respective cell that is located at least partially within the macro cell; determining resource usage via said home base station; setting a target power for said home base station based on said information identifying a quantity of home base stations and said determined resource usage; and communicating said target power set for said home base station to at least one user communication device.

According to one aspect there is provided a method performed by a base station in a communication system, the method comprising: operating a cell in which at least one cell operated by at least one home base station is located at least partially; and providing, to said at least one home base station, information identifying a quantity of home base stations that each operate at least one respective cell that is located at least partially within the macro cell to facilitate setting of a target power by said at least one home base station based on said information identifying a quantity of home base stations and a resource usage via said at least one home base station.

According to one aspect there is provided a method performed by a communication device of a communication system in which a macro base station operates a macro cell in which at least one cell operated by at least one home base station is located at least partially, the method comprising: communicating with other communication devices via said at least one cell, operated by said at least one home base station; and setting a transmission power of said communication device, responsive to receipt from said at least one home base station of information identifying a target power, whereby to meet said received target power, wherein said information identifying a target power received from said at least one home base station identifies a target power that is based on information identifying a quantity of home base stations operating a cell that is located at least partially in said macro cell and on resource usage via said at least one home base station from which said target power is received.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which.

DESCRIPTION OF EMBODIMENTS

<Overview>

Figure 1:
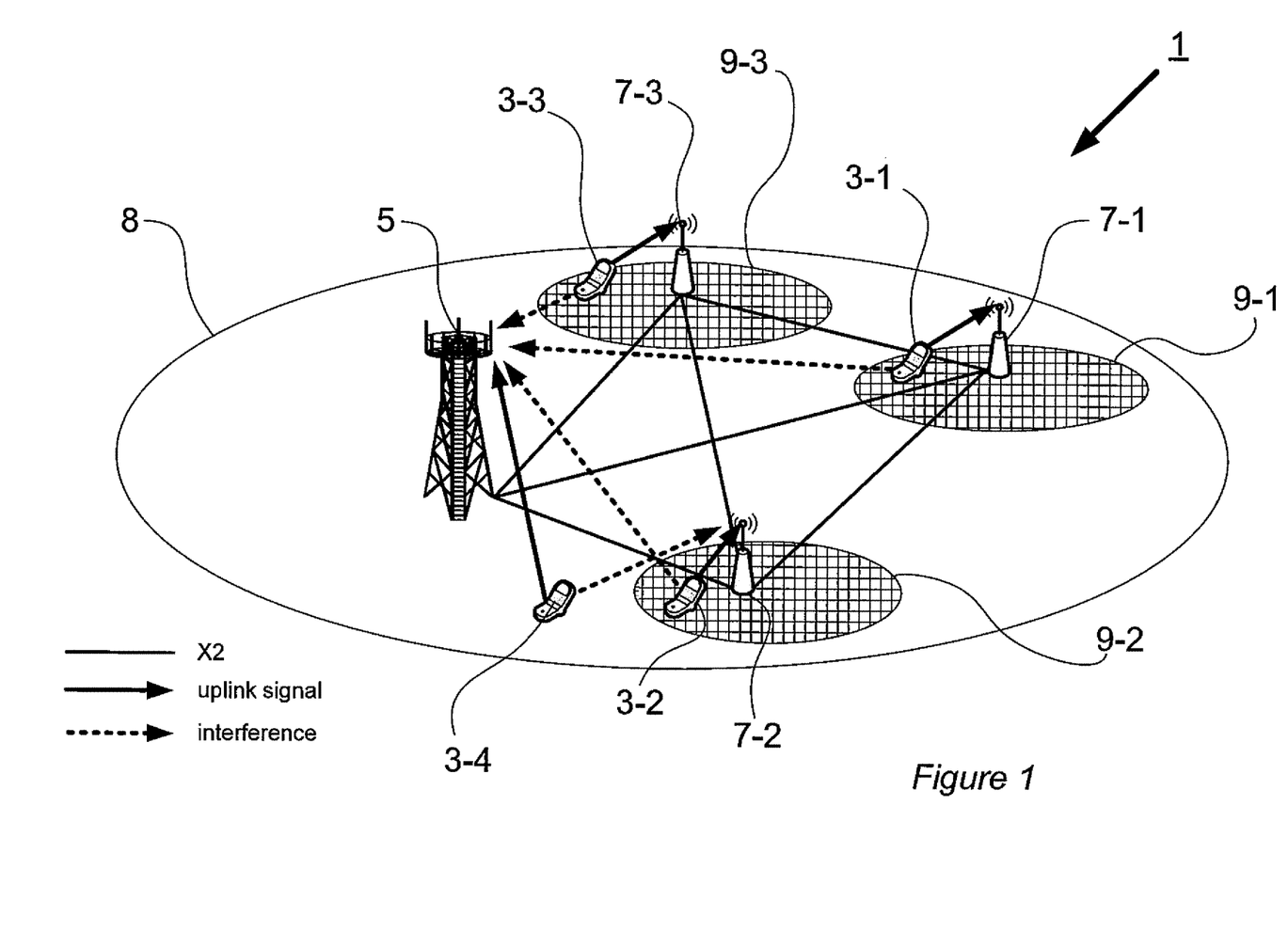
FIG. 1 schematically illustrates a telecommunication system.

FIG. 1 schematically illustrates a mobile (cellular) telecommunication system 1 in which a user of any of a plurality of user communication devices 3-1 to 3-4 can communicate with other users via one or more of a plurality of base stations 5, 7 including, in this example, a large cell base station 5 and a plurality of small cell base stations 7-1, 7-2 and 7-3. In the system illustrated in FIG. 1, each base station 5, 7 shown is an Evolved Universal Terrestrial Radio Access Network (E-UTRAN) base station capable of operating in a multi-carrier environment.

In FIG. 1, the large cell base station 5 comprises a so called 'macro' base station operating a relatively geographically large 'macro' cell 8. The other, small cell, base stations 7-1 to 7-3 shown in FIG. 1 each comprises a so called 'home' (or 'pico', or 'femto') base station operating a respective small (or 'pico', or 'femto') cell 9-1 to 9-3. It will be appreciated that each base station 5, 7 may operate a respective plurality of cells, especially where carrier aggregation is used (e.g. so called primary cells, 'PCells', and/or secondary cells, 'SCells').

The power used to provide small cells 9 is low relative to the power used for the macro cell 8 and the small cells 9 are therefore small relative to the macro cell 8. As shown in FIG. 1, in this example the geographical coverage of each of the small cells 9 falls completely within the geographical coverage of the macro cell 8 although it will be appreciated that they may overlap partially with the geographical coverage of the macro cell 8.

The base stations 5, 7, are interconnected with one another by a so-called 'X2' interface via which the base stations 5, 7 can communicate directly with one another.

One of the user communication devices 3-4 is operating, as 'macro user equipment (MUE)', in the macro cell 8 and is served by the macro base station 5. The other communication devices 3-1 to 3-3 are each operating, as 'home user equipment (HUE)' in a respective small cell 9-1 to 9-3, and are each served by a respective home base station 7-1 to 7-3.

In the example illustrated in FIG. 1, uplink communication from the HUEs 3-1 to 3-3 to their respective home base stations 7-1 to 7-3 causes interference with the uplink communication of the MUE 3-4 and the uplink communication from the MUE 3-4 causes interference with the uplink communication of one of the HUEs 3-2.

Advantageously, the mobile (cellular) telecommunication system 1 employs a distributed uplink power control algorithm in which each home base station 7 is able to individually set a respective uplink target received power based on a calculation reflecting their own likely contribution to overall interference. Specifically, respective uplink target received power is respectively set, at each base station 7, adaptively based on the location of that home base station 7 and that home base station's own individual uplink physical resource block usage contribution to the overall resource block usage.

More specifically, in the calculations used in this example, the respective uplink target received power ($P_{o\_H, i}$) for each home base station, i, is set in dependence on:

(i) the target received power ($P_{o\_M}$) at the macro base station 5, $P_{o\_M}$ is a cell specific parameter that is broadcasted by a base station as a part of the system information;

(ii) an internal signal to interference plus noise ratio (SINR) parameter ($\Gamma_i$) for that home base station 7;

(iii) a measure of the path loss ($L_{M, i}$) between a 'home' user communication device (HUE) 3-1 to 3-3 of that home base station 7 and the macro base station 5 (modified appropriately by a path loss compensation factor ($\alpha_M$) for the macro base station 5);

(iv) a measure of the path loss ($L_{H, i}$) between the 'home' user communication device (HUE) 3-1 to 3-3 and that home base station 7 (modified appropriately by a path loss compensation factor ($\alpha_H$) for the home base station 7);

(v) a measure of the home base station's own individual uplink physical resource block usage ($U_{H, i}$); and (vi) the number of home base stations 7 in the cell 8 of the macro base station 5 that have active HUEs 3-1 to 3-3.

The user communication device (HUE) served by the home base station reports the measured values of Reference Signal Received Power (RSRP) for both the home base station and the master base station. The home base station calculates $L_{H, i}$ by subtracting the RSRP from its reference signal power, and $L_{M, i}$ by subtracting the RSRP from the reference signal power broadcasted by master base station. The path loss compensation factor is a cell specific parameter that is provided by higher layers.

It will be appreciated that, whilst the above set of parameters are particularly useful, the respective uplink target received power ($P_{o\_H, i}$) for each home base station may be set based on a different, augmented, or simplified set of parameters and still reflect that home base station's own likely contribution to overall interference sufficiently. For example, instead of the number of home base stations 7 in the cell 8 of the macro base station 5 that have active HUEs, the calculation may be based on the number of home base stations 7 in the cell 8 of the macro base station 5 regardless of whether they have active users or not.

Beneficially, to support implementation of the distributed uplink power control algorithm the macro base station and home base stations 5, 7 of the communication system 1, are configured to exchange the number (N) of home base stations having active home user communication devices (HUEs) 3-1 to 3-3, in the macro cell, via the X2 interfaces. Advantageously, such an exchange can occur between the macro base station 5 and each home base station 7 (e.g. via a respective macro base station to home base station X2 interface). Such an exchange can also occur between the macro base station 5 and one or more of a subset of the home base stations 7, and between a home base station 7 that receives the number (N) of home base stations having active HUEs 3-1 to 3-3 and another home base station 7 (e.g. via a home base station to home base station X2 interface).

It can be seen, therefore, that the distributed uplink power control algorithm, helps to ensure fairer treatment of home base stations in dependence on their own individual contribution to overall interference in the macro cell.

This provides a number of advantages over currently proposed systems including, but not limited to: eliminating (or at least reducing) the need for a home base station management system (HeMS) for the purposes of UL power control for interference management; significantly reducing signalling traffic load between the home base stations and any home base station management system; and eliminating, or at least mitigating, the need for synchronisation between the home base stations and any home base station management system.

<Macro Base Station>

Figure 2:
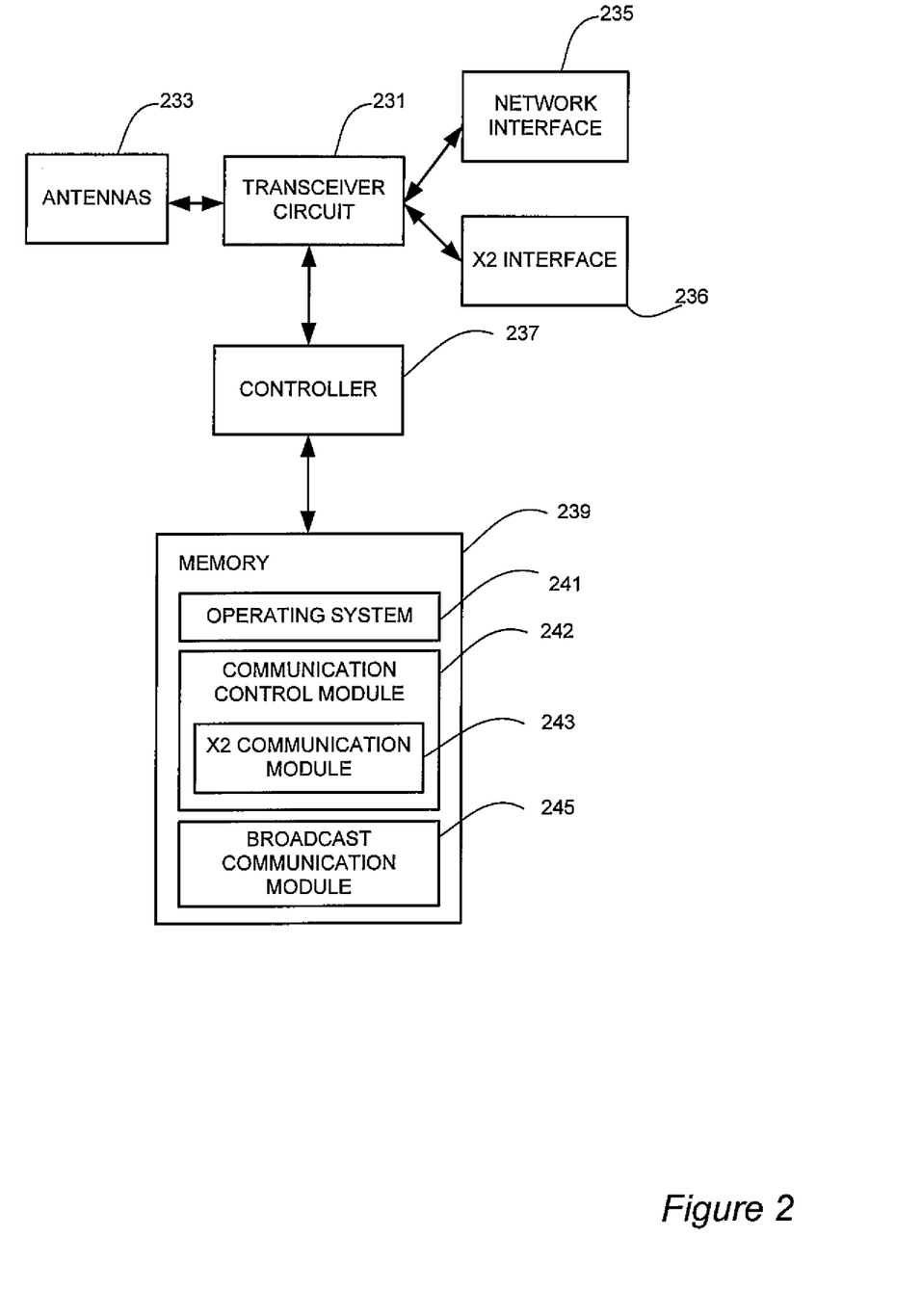
FIG. 2 shows a simplified block diagram of a macro base station for the telecommunication system of FIG. 1.

FIG. 2 is a block diagram illustrating the main components of the macro base station 5 shown in FIG. 1. The macro base station 5 comprises an E-UTRAN base station comprising a transceiver circuit 231 which is operable to transmit signals to, and to receive signals from, the mobile communication devices 3 via a plurality of antennas 233. The base station 5 is also operable to transmit signals to and to receive signals from a core network via a network interface 235 and with other macro or home base stations via an X2 interface 236.

The operation of the transceiver circuit 231 is controlled by a controller 237 in accordance with software stored in memory 239.

The software includes, among other things, an operating system 241, a communication control module 242, an X2 communication module 243, and a broadcast communication module 245.

The communication control module 242 is operable to control communication with the mobile communication devices 3-4 in the macro cell 8 and with the core network and other base stations via the associated interfaces 235 and 236.

The X2 communication module 243 forms part of the communication control module 242 and manages the communication with other macro or home base stations via the X2 interface 236, and the broadcast communication module 245 manages broadcast communications via the antenna, for example of system information in the form of system information blocks (SIBs).

<Home Base Station>

Figure 3:
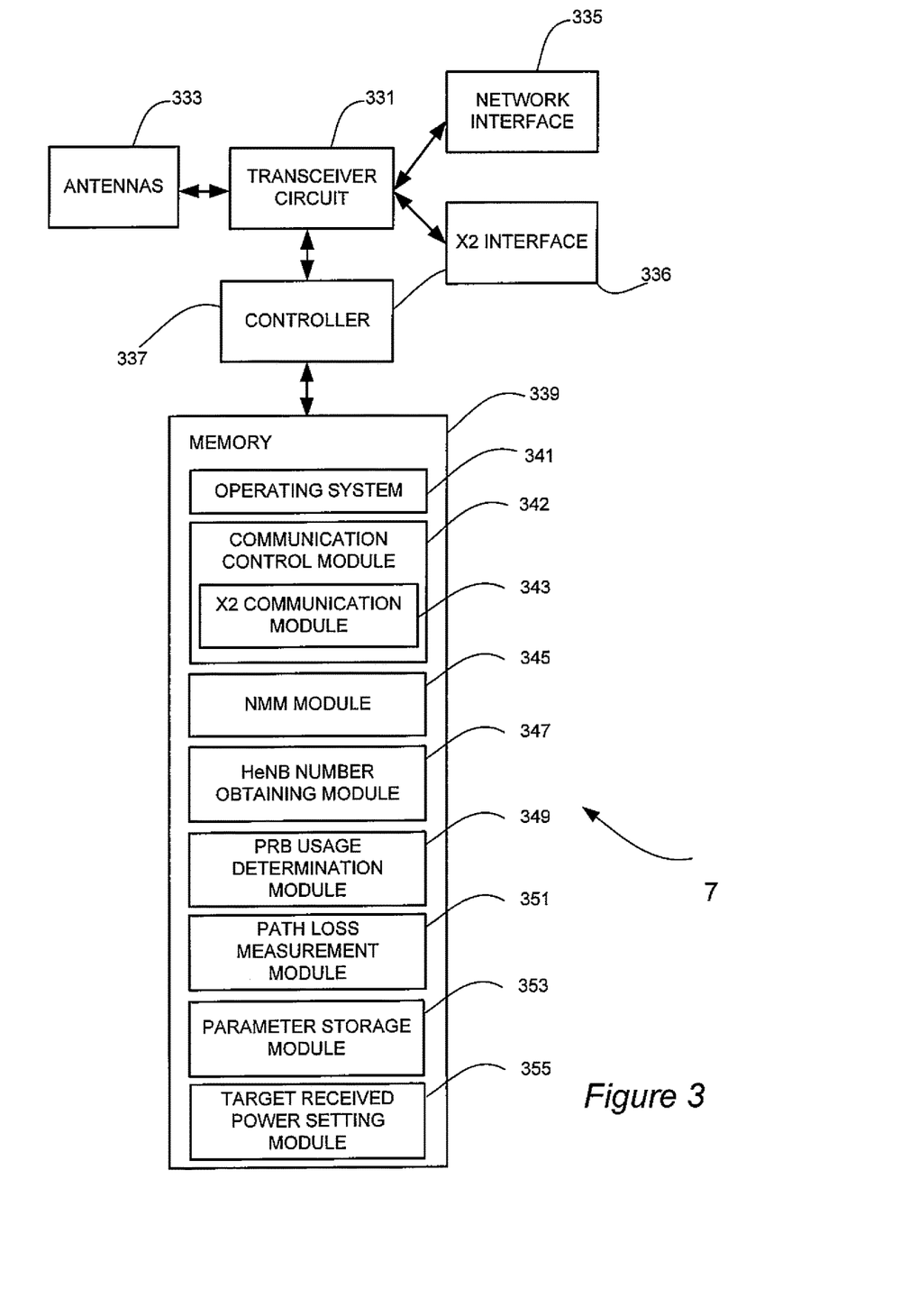
FIG. 3 shows a simplified block diagram of a small cell base station for the telecommunication system of FIG. 1.

FIG. 3 is a block diagram illustrating the main components of a home base station 7 of shown in FIG. 1. Each home base station 7 comprises an E-UTRAN home base station comprising a transceiver circuit 331 which is operable to transmit signals to, and to receive signals from, the communication device, 3-1 to 3-3, operating in the cell 9 of that base station via at least one antenna 333. The base station 7 is also operable to transmit signals to and to receive signals from a core network via a core network via a network interface 335 and with macro or home base stations via an X2 interface 336.

The operation of the transceiver circuit 331 is controlled by a controller 337 in accordance with software stored in memory 339.

The software includes, among other things, an operating system 341, a communication control module 342, an X2 communication module 343, an NMM module 345, HeNB number obtaining module 347, PRB usage determination module 349, path loss determination module 351, a parameter storage module 353, and a target received power setting module 355.

The communication control module 342 is operable to control communication with the communication devices 3-1 to 3-3 in the cell 9 operated by the home base station 7, and with the core network and other base stations via the associated interfaces 335 and 336.

The X2 communication module 343 forms part of the communication control module 342 and manages the communication with other base stations via the X2 interface 336.

The NMM module 345 handles network monitor mode (NMM) functions such as the monitoring of system information broadcast in system information blocks (SIBs). The HeNB number obtaining module 347 obtains the total number of home base stations in the macro cell 8 and/or the total number of home base stations in the macro cell 8, having active users. The PRB usage determination module 349 determines uplink PRB usage ($U_{H,i}$) (and other PRB usage) by the home base station 7. The path loss determination module 351 measures or otherwise determines a path loss measure ($L_{M,i}$) for communication between a home user communication device (HUE) 3-1 to 3-3 of that home base station 7 and the macro base station 5 and a measure of the path loss ($L_{H,i}$) between the home user communication device (HUE) 3-1 to 3-3 and that home base station 7.

The parameter storage module 353 stores the other parameters required for the calculation of an appropriate target received power including: the target received power ($P_{o\_M}$) at the macro base station 5; an internal signal to interference plus noise ratio (SINR) parameter ($\Gamma_i$) for that home base station 7; path loss compensation factors ($\alpha_M, \alpha_H$) for the macro base station 5 and home base station 7.

The target received power setting module 355 sets the target received power based on: the target received power ($P_{o\_M}$) at the macro base station 5; the internal signal to interference plus noise ratio (SINR) parameter ($\Gamma_i$) for that home base station 7; the measure of the path loss ($L_{M,i}$) between a 'home' user communication device (HUE) 3-1 to 3-3 of that home base station 7 and the macro base station 5 (modified appropriately by a path loss compensation factor ($\alpha_M$) for the macro base station 5); the measure of the path loss ($L_{H,i}$) between the 'home' user communication device (HUE) 3-1 to 3-3 and that home base station 7 (modified appropriately by a path loss compensation factor ($\alpha_H$) for the home base station 7); a measure of the home base station's own individual uplink physical resource block usage ($U_{H,i}$); and the number of home base stations 7 in the cell 8 of the macro base station 5 (e.g. that have active HUEs 3-1 to 3-3).

The target received power setting module 355 also manages the communication between the home base station 7 and the HUEs 3-1 to 3-3 in its cell 9 to adjust the transmission power of those HUEs to meet the target received power set by the target received power setting module 355.

<Mobile Communication Device>

Figure 4:
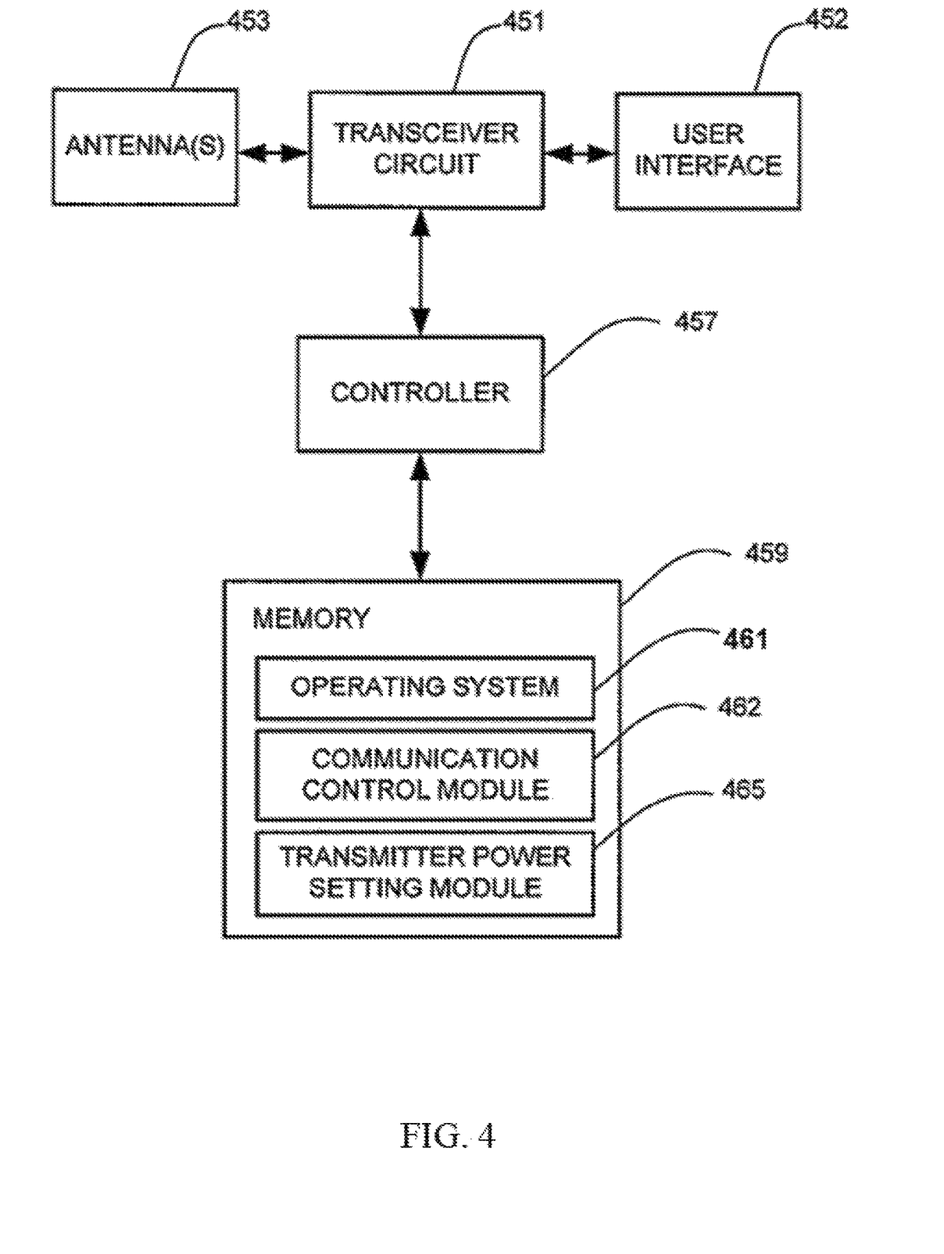
FIG. 4 shows a simplified block diagram of a mobile communication device for the telecommunication system of FIG. 1.

FIG. 4 is a block diagram illustrating the main components of the user communication devices 3 shown in FIG. 1. Each user communication device 3 comprises a mobile (or 'cell') telephone. The user communication device 3 comprises a transceiver circuit 451 which is operable to transmit signals to, and to receive signals from, the base stations 5, 7 via at least one antenna 453 and a user interface 452 for receiving inputs from and providing outputs to a user.

The operation of the transceiver circuit 451 is controlled by a controller 457 in accordance with software stored in memory 459.

The software includes, among other things, an operating system 451, a communication control module 462, and a transmitter power setting module 465.

The communication control module 442 is operable to control communication with the base stations 5, 7 and the transmitter power setting module manages communication with the base stations 5, 7 to set the transmitter power of the user communication device 3 in order to fulfil any target received power requirements at the base stations 5, 7.

<Operation>

The operation to apply the distributed uplink power control mechanism will now be described in more detail, by way of example only, with reference to FIG. 5 which is a simplified timing diagram illustrating the procedure followed by a single home base station 7-1 implementing the distributed uplink power control mechanism.

Figure 5:
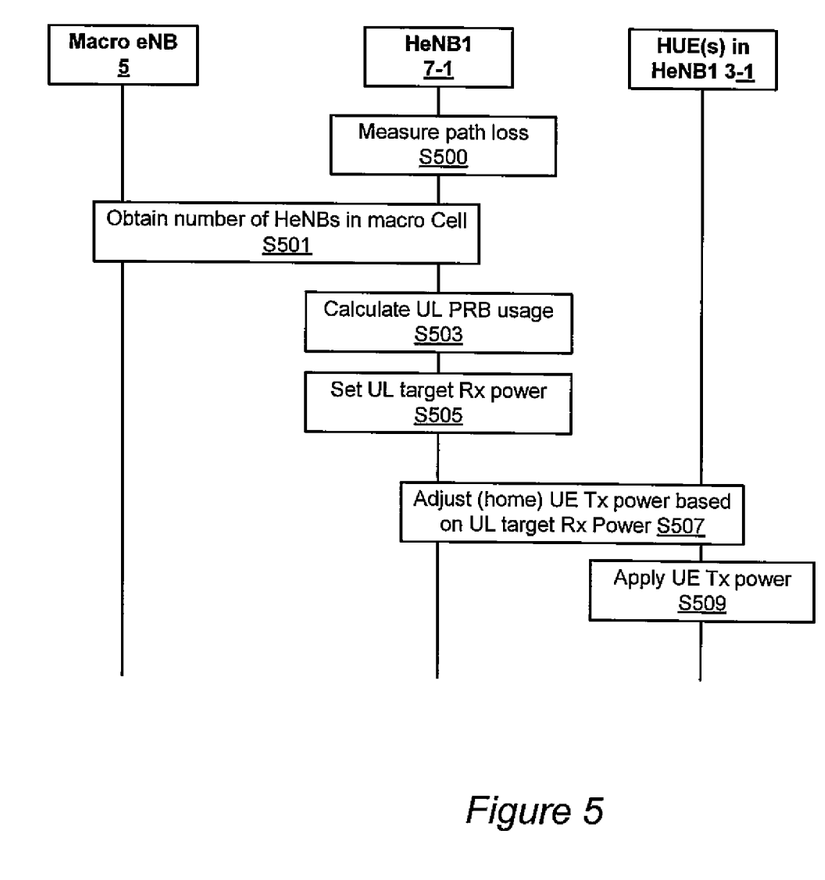
FIG. 5 shows a simplified timing diagram illustrating a procedure for implementing distributed power management.

As seen in FIG. 5, the home base station 7-1 calculates the path loss at S500, prior to obtaining, at S501, the number, N, of home base stations 7, in the macro cell 8, having active users.

In this example the number, N, of home base stations 7 is obtained from the macro base station 5 although it will be appreciated that it may be obtained from another home base station 7. Further it will be appreciated that, instead of the number of home base stations 7 having active users, the total number of home base stations 7 (regardless of whether or not they have active users) may be obtained and used in the subsequent calculation of target received power.

The home base station 7-1 calculates its UL PRB usage at S503 and sets its target UL received power accordingly at S505. In this example, the target UL received power ($P_{o\_H,i}$) for each home base station, i, is set using the following equation:

[Math. 1]

$$P_{o\_H,i} = P_{o\_M} - \Gamma_i + \alpha_M L_{M,i} - \alpha_H L_{H,i} - 10\log_{10}(U_{H,i}N) \quad (1)$$

where, $P_{o\_M}$ is the target received power at the macro base station 5;

$\Gamma_i$ is an internal signal to interference plus noise ratio (SINR) parameter for that home base station i, representing the SINR of a macro served user communication device (MUE) at the macro base station taking account of the usage of home base station, i;

$L_{M,i}$ is a measure of the path loss between a 'home' user communication device (HUE) of that home base station, i, and the macro base station 5;

$\alpha_M$ is a path loss compensation factor for the macro base station 5;

$L_{H,i}$ is a measure of the path loss between the 'home' user communication device (HUE) and that home base station, i;

$\alpha_H$ is a path loss compensation factor for the home base station 7;

$U_{H,i}$ is the measure of the home base station's own individual uplink physical resource block usage; and N is the obtained number of home base stations 7 in the cell 8 of the macro base station 5 that have active HUEs.

Once target UL received power has been set at S505 the home base station 7-1 communicates with the HUE(s) 3-1 in the cell 9-1 of that base station to adjust their transmission power appropriately whereby to alleviate interference. Typically, the home base station 7-1 broadcasts the target received power $P_{o\_H,i}$ value to all user communication devices within range, when the target received power is reduced, and the affected user communication devices reduce their transmission power by a corresponding amount thereby reducing interference to the macro base station. Specifically, based on the $P_{o\_H,i}$, each user communication device (HUE) will calculate its transmit power as follows:

$$Ptx = \min\{P_{Max}, 10\log_{10}(M) + P_o + \alpha \cdot PL + \Delta_{TF} + f_c\} \quad [\text{Math. 2}]$$

where Ptx [dBm] is the transmit power of the physical uplink shared channel (PUSCH), $P_{Max}$ [dBm] is the configured maximum UE transmit power, M is the bandwidth of the PUSCH resource assignment expressed in the number of physical resource blocks (PRB) scheduled for a user and a subframe, $P_o$ [dBm] is target received power (user or cell specific), α is a cell-specific path loss compensation factor, PL [dB] is a downlink path loss estimate calculated in the UE, $\Delta_{TF}$ [dB] is a user-specific parameter that depends on the Modulation and Coding Scheme (MCS), and $f_c$ [dB] is a user-specific correction. As a whole, the power control equation consists of open loop ($P_o + \alpha \cdot PL$) and closed loop ($f_c$) components. The open loop component decides the target received power for all users and is compensated by the slow change of the path loss including shadowing, while the closed loop is used for user-specific adjustments.

It will be appreciated that whilst the procedure has been described in a sequential order some of the steps may occur in parallel or in a different order. For example the determination of path loss (S500) and UL PRB usage (S505) may occur at any appropriate time prior to setting the uplink target received power (S507).

<Derivation of Target UL Received Power Equation>

A derivation of the target UL received power equation (1) will now be provided to assist the skilled reader.

The derivation starts with an equation for desired UL received power, $S_{M,i}$, at the macro base station 5 for a macro served user device, and an equation for UL interference power, $I_{H,i}$, received at the macro base station 5 from a home user communication device 3-1 to 3-3 as follows:

[Math. 3]

$$\tilde{S}_{M,i} = \frac{\tilde{P}_{o\_M} \tilde{L}_{M,i}^{\alpha_M}}{\tilde{L}_{M,i}} \quad (2)$$

$$\tilde{I}_{H,i} = \frac{\tilde{P}_{o\_H,i} \tilde{L}_{H,i}^{\alpha_H}}{\tilde{L}_{M,i}} \quad (3)$$

Where equations (2) and (3) are written below using linear quantities, rather than of dB quantities, with tildes denoting the linear quantities. As explained above, $P_{o\_H,i}$ is the target UL received power for each home base station, i; $P_{o\_M}$ is the target received power at the macro base station 5; $L_{M,i}$ is a measure of the path loss between a 'home' user communication device of that home base station, i, and the macro base station 5; $\alpha_M$ is a path loss compensation factor for the macro base station 5; $L_{H,i}$ is a measure of the path loss between the 'home' user communication device and that home base station, i; and $\alpha_H$ is a path loss compensation factor for the home base station 7.

The (linear) SINR of the macro served user communication device (MUE) 3-1 at the macro base station 5, taking into account a usage factor of each home base station 7, is:

[Math. 4]

$$\tilde{\Gamma}_i = \frac{\tilde{S}_{M,i}}{\sum_{i=1}^{N} \tilde{I}_{H,i} U_{H,i}} \quad (4)$$

Where, as explained above: N is the number of home base stations 7 in the macro cell (typically, but not essentially, comprising the number having active users); and $U_{H,i}$ is a measure of the individual uplink physical resource block usage of the home base station, i.

[Math. 5]

Substituting for $\tilde{S}_{M,i}$ and $\tilde{I}_{H,i}$ and re-arranging gives $$\sum_{i=1}^{N} \frac{\tilde{P}_{o\_H,i} \tilde{L}_{H,i}^{\alpha_H}}{\tilde{L}_{M,i}} U_{H,i} = \frac{\tilde{P}_{o\_M} \tilde{L}_{M,i}^{\alpha_M}}{\tilde{\Gamma}_i \tilde{L}_{M,i}} \quad (5)$$

A constraint is then applied in the form of an operator configurable parameter, β, that is constant for all home base stations and lies in the range not smaller than 0 and not greater than 1 such that:

[Math. 6]

$$\frac{\tilde{P}_{o\_H,i}\tilde{L}_{H,i}^{\alpha_H}}{\tilde{L}_{M,i}}(U_{H,i})^\beta = C \quad (6)$$

Thus if β=0 then this implies that the (linear) UL interference power, $I_{H,\,i}$, received at the macro base station 5 is constant for all home base stations. If, on the other hand, β>0, it implies that the received power target of each home base station can be reduced in proportion to $(U_{H,\,i})^\beta$ (and hence that home base stations with lower PRB usage can be allowed to use a higher received power target).

The SINR condition of equation (5) may thus be rewritten as:

[Math. 7]

$$C\sum_{i=1}^{N} U_{H,i}^{1-\beta} = \frac{\tilde{P}_{o\_M}\tilde{L}_{M,i}^{\alpha_M}}{\tilde{\Gamma}_i \tilde{L}_{M,i}} \quad (7)$$

Taking $\log_{10}$ of each side and re-arranging gives:

[Math. 8]

$$10\log_{10}(C) = P_{o\_M} + \alpha_M L_{M,i} - \Gamma_i - L_{M,i} - 10\log_{10}\left(\sum_{i=1}^{N} U_{H,i}^{1-\beta}\right) \quad (8)$$

And then substituting for C gives:

[Math. 9]

$$P_{o\_H,i} = P_{o\_M} - \Gamma_i + \alpha_M L_{M,i} - \alpha_H L_{H,i} - 10\log_{10}\left(U_{H,i}^\beta \sum_{i=1}^{N} U_{H,i}^{1-\beta}\right) \quad (9)$$

As expected, if β=0 then this results in the same target received power being applied at all home base stations based on a summation (aggregation) of UL PRB usage for all home base stations. However, setting β=1 results in equation (1) as repeated below:

[Math. 10]

$$P_{o\_H,i} = P_{o\_M} - \Gamma_i + \alpha_M L_{M,i} - \alpha_H L_{H,i} - 10\log_{10}(U_{H,i}N)$$

Thus, instead of a target received power that is the same for all home base stations, based on a summation (aggregation) of UL PRB usage, the target received power varies in dependence on the individual PRB usage at a particular home base station—(i.e. $U_{H,\,i}N$ is used instead of

[Math. 11]

$$\sum_{i=1}^{N} U_{H,i}\Bigg).$$

<Obtaining 'N'>

As explained above, in order for a home base stations 7 to do the calculation for setting the target received power it is necessary for them to obtain an estimated or actual number, N, of home base stations in the macro cell 8. There are a number of ways in which this can be achieved.

Re-Use of Current Information Elements (IEs) of X2 Setup Request Message

Figure 6:
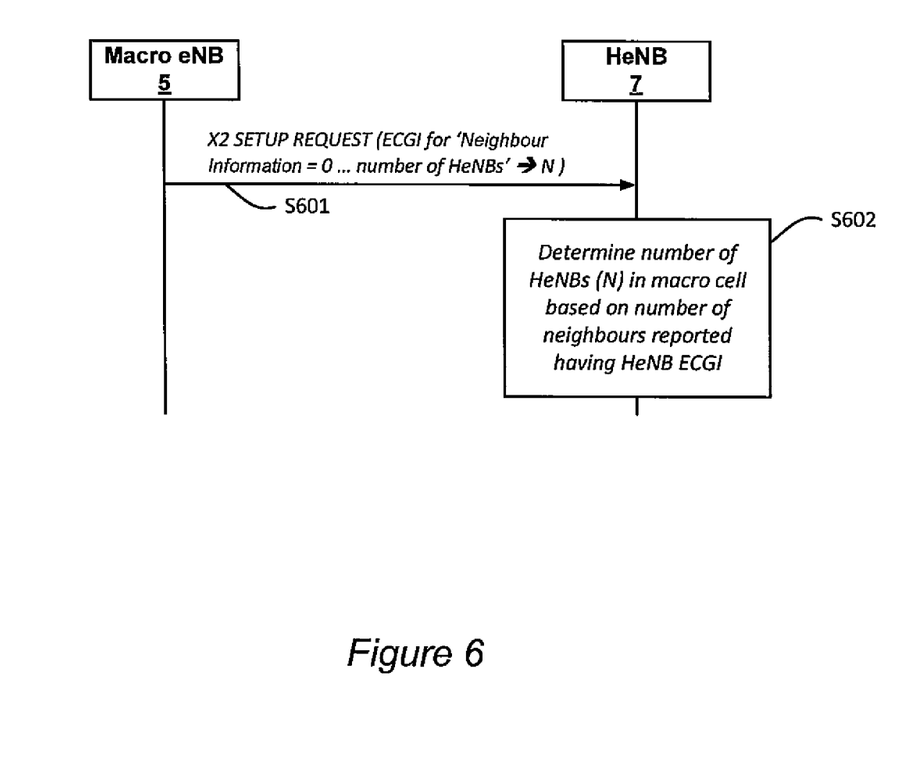
FIG. 6 shows a simplified timing diagram illustrating a procedure for obtaining information for use in the distributed power management procedure of FIG. 5.

In one example, as illustrated in FIG. 6, the information on the number, N, of home base stations (either home base stations having active users or all home base stations) in the macro cell 8 is provided in an appropriate X2 message from the macro base station 5 to the home base station 7 doing a calculation for setting the target received power, or from another home base station 7 to that home base station 7. Specifically, in this example, the distributed UL power control technique beneficially makes use of an existing X2 message—the X2 Setup Request—to inform the home base station 7 doing the calculation. The X2 Setup Request Message is defined in section 9.1.2.3 of the 3$^{rd}$ Generation Partnership Project (3GPP) Technical Standard (TS) 36.423.

As defined in 3GPP TS 36.423, the X2 Setup Request Message message is sent by an eNB to a neighbouring eNB to transfer the initialisation information for a Transport Network Layer 'TNL' association. The contents of the current version of the X2 Setup Request Message are summarised below in Tables 1(a) and 1(b) below.

Unlike the current X2 Setup Request Message, however, the number, N, of home base stations in the macro cell 8 is provided by using the 'maxnoofNeighbours' as part of the Neighbour-Information information element (i.e. instead of the current maximum value of 512). The E-UTRAN Cell Global Identifier (ECGI) is sent to the home base station 7 in the X2 Setup Request Message in order to allow the home base station 7 to identify the macro base station 5 operating the cell 8 in which the home base stations 7, in the list of neighbouring cells in the X2 Setup Request Message, are located thereby allowing the home base station 7 setting the target received power to determine how many home base stations 7 there are in the cell 8 of that macro base station 5.

Specifically, as set out in section 9.2.14 of 3GPP TS36.423 (repeated in Table 2 below) the leftmost bits of the E-UTRAN Cell Identifier, on which the ECGI referred to in Table 1(a) is based, correspond to the value of the eNB ID IE contained in the Global eNB ID IE defined in and 9.2.22 of 3GPP TS36.423 (repeated in Table 3 below). The Macro eNB ID it is equal to the 20 leftmost bits of the value of the E-UTRAN Cell Identifier IE contained in the ECGI IE while the Home eNB ID is equal to the full value (all 28 bits) of the E-UTRAN Cell Identifier IE contained in the ECGI IE.

TABLE 1(a)

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |

TABLE 1(a)-continued

| IE/Group Name | Presence | Range | IE type and reference | Semantics description | Criticality | Assigned Criticality |
|---|---|---|---|---|---|---|
| Served Cells | | 1 .. <maxCellineNB> | | Complete list of cells served by the eNB | YES | reject |
| >Served Cell Information | M | | 9.2.8 | | — | — |
| >Neighbour Information | | 0 .. <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0..503, ...) | Physical Cell Identifier of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| GU Group Id List | | 0 .. <maxfPools> | | List of all the pools to which the eNB belongs | GLOBAL | reject |
| >GU Group Id | M | | 9.2.20 | | — | — |

TABLE 1(b)

| Range bound | Explanation |
|---|---|
| maxCellineNB | Maximum no. cells that can be served by an eNB. Value is 256. |
| maxnoofNeighbours | Maximum no. of neighbour cells associated to a given served cell. Value is 512. |
| maxPools | Maximum no. of pools an eNB can belong to. Value is 16. |

TABLE 2

| IE/Group Name | Presence | Range | IE type and reference | Semantics description | Criticality | Assigned Criticality |
|---|---|---|---|---|---|---|
| PLMN Identity | M | | 9.2.4 | | — | — |
| E-UTRAN Cell Identifier | M | | BIT STRING (28) | The leftmost bits of the E-UTRAN Cell Identifier IE value correspond to the value of the eNB ID IE contained in the Global eNB ID IE (defined in section 9.2.22) identifying the eNB that controls the cell. | | |

TABLE 3

| IE/Group Name | Presence | Range | IE type and reference | Semantics description | Criticality | Assigned Criticality |
|---|---|---|---|---|---|---|
| PLMN Identity | M | | 9.2.4 | | — | — |
| CHOICE eNB ID | M | | | | — | — |
| >Macro eNB ID | M | | BIT STRING (20) | Equal to the 20 leftmost bits of the value of the E-UTRAN Cell Identifier IE contained in the ECGI IE (see section 9.2.14) identifying each cell controlled by the eNB | — | — |
| >Home eNB ID | M | | BIT STRING (28) | Equal to the value of the E-UTRAN Cell Identifier IE contained in the ECGI IE (see section 9.2.14) identifying the cell controlled by the eNB | — | — |

New IE in Current X2 Setup Request Message

Figure 7:
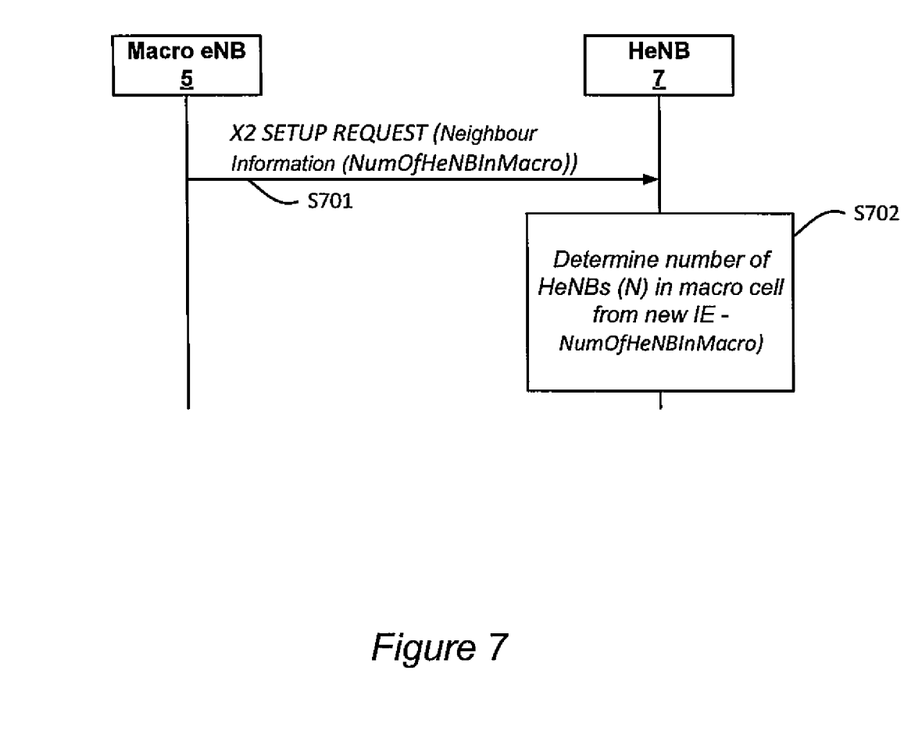
FIG. 7 shows a simplified timing diagram illustrating a procedure for obtaining information for use in the distributed power management procedure of FIG. 5.

In a variation of the above example, as illustrated in FIG. 7, a new dedicated information element is provided in the X2 Setup Request message to carry the value of the number, N, of home base stations in the macro cell 8 (either home base stations having active users or all home base stations). The name of such a new dedicated information element is, of course, somewhat arbitrary but it is envisaged that it would be called 'NumofHeNBinMacro' or the like as set out in Table 4 below which is a modified extract of Table 1(a). It will be appreciated that it may be mandatory for the macro base station 5 to include such an IE in the X2 Setup Request message with an optional requirement for the home base stations to include it in the X2 Setup Request message for exchange between home base stations 7.

Using Network Monitoring Mode (NMM)

Figure 8:
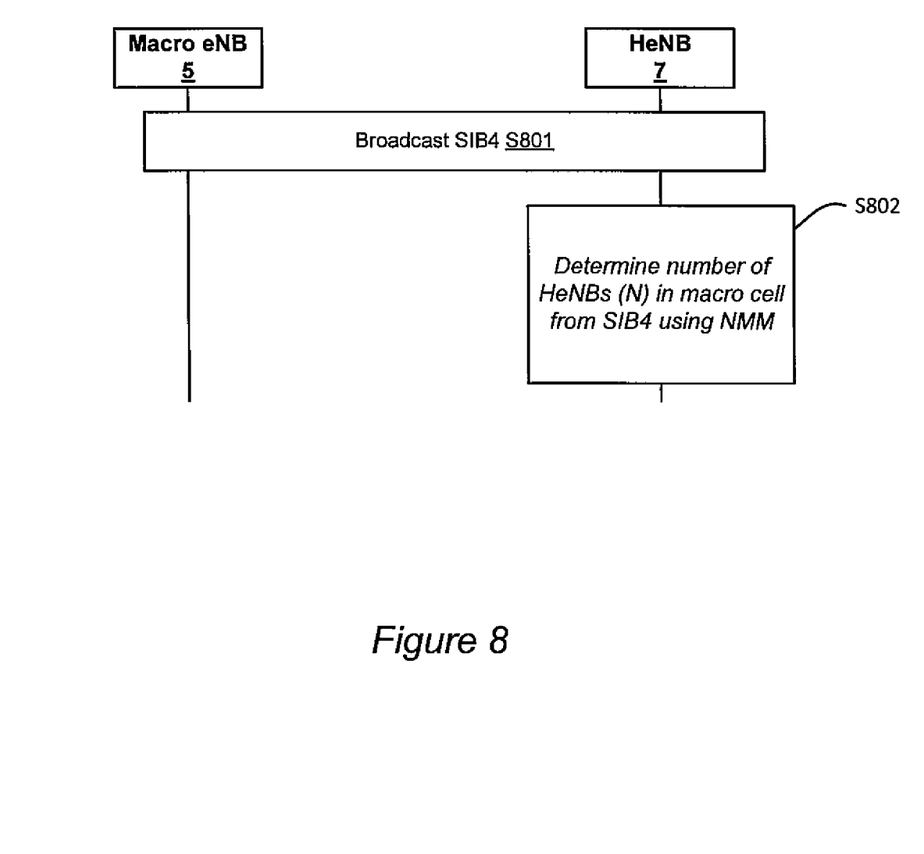
FIG. 8 shows a simplified timing diagram illustrating a procedure for obtaining information for use in the distributed power management procedure of FIG. 5.

In another variation, as illustrated in FIG. 8, the home base stations 7 could advantageously make use of the so called 'Network Monitoring Mode' (NMM) to obtain the number, N, of home base stations in the macro cell 8. It will be appreciated that this could be provided in addition to or as an alternative to one or more of the other methods for obtaining the number, N, of home base stations 7 in the macro cell 8.

In this case the home base stations 7 would use the Network Monitoring Mode (NMM) to acquire the information on neighbouring intra-frequency cells that is broadcast by a macro base station 5, using the fourth type of system information block (SIB4—IE 'SystemInformationBlockType4'), as illustrated in Tables 5(a) to 5(c) below, for the purposes of intra-frequency cell re-selection, as set out in section 6.3.1 of 3GPP TS 36.331. The IE SystemInformationBlockType4 contains neighbouring cell related information relevant for intra-frequency cell re-selection. The IE includes cells with specific re-selection parameters as well as blacklisted cells and is illustrated in Tables 5(a) to 5(c) below However, because SIB4 information only provides a physical cell ID ('physCellId') list, the home base station 7 beneficially differentiates between the PCI list of macro base stations 5 and the PCI list of home base stations 7. Specifically, before starting the NMM procedure, a network management system splits the PCI resources, based on the cell type information, so that macro base stations 5 will be assigned a different PCI range compared to the PCI range allocated to home base stations 7. In this way, therefore, when listening to the SIB4 information of neighbouring cells 9, a home base station can differentiate between the PCI ranges of the macro base stations and home base stations in order to identify home base stations and thus obtain the number of neighbouring home base stations in the cell 8 of the serving macro base station 5.

TABLE 4

| >Neighbour Information | — | 0 .. <maxnoofNeighbours> | | | — | — |
|---|---|---|---|---|---|---|
| >>NumofHeNBinMacro | M/O | | | | | |
| >>ECGI | M | | ECGI 9.2.14 | E-UTRAN Cell Global Identifier of the neighbour cell | — | — |
| >>PCI | M | | INTEGER (0 .. 503, . . . ) | Physical Cell Identifier of the neighbour cell | — | — |

TABLE 5(a)

SystemInformationBlockType4 information element

```
-- ASN1START
SystemInformationBlockType4 ::=        SEQUENCE {
     intraFreqNeighCellList                  IntraFreqNeighCellList
```

TABLE 5(a)-continued

| SystemInformationBlockType4 information element | | |
|---|---|---|
| OPTIONAL, | -- Need OR | |
| intraFreqBlackCellList | | IntraFreqBlackCellList |
| OPTIONAL, | -- Need OR | |
| csg-PhysCellIdRange | | PhysCellIdRange |
| OPTIONAL, | -- Cond CSG | |
| . . ., | | |
| lateNonCriticalExtension | | OCTET STRING |
| OPTIONAL | -- Need OP | |
| } | | |
| IntraFreqNeighCellList ::= | SEQUENCE (SIZE (1..maxCellIntra)) OF IntraFreqNeighCellInfo | |
| IntraFreqNeighCellInfo ::= | SEQUENCE { | |
| physCellId | | PhysCellId, |
| q-OffsetCell | | Q-OffsetRange, |
| . . . | | |
| } | | |
| IntraFreqBlackCellList ::= | SEQUENCE (SIZE (1..maxCellBlack)) OF PhysCellIdRange | |
| -- ASN1STOP | | |

TABLE 5(b)

SystemInformationBlockType4 field descriptions csg-PhysCellIdRange
Set of physical cell identities reserved for CSG cells on the frequency on which this field was received. The received csg-PhysCellIdRange applies if less than 24 hours has elapsed since it was received and the UE is camped on a cell of the same primary PLMN where this field was received. The 3 hour validity restriction (section 5.2.1.3) does not apply to this field. The UE shall not apply any stored csg-PhysCellIdRange when it is in any cell selection state defined in TS 36.304 [4].
intraFreqBlackCellList
List of blacklisted intra-frequency neighbouring cells.
intraFreqNeighbCellList
List of intra-frequency neighbouring cells with specific cell re-selection parameters.
q-OffsetCell
Parameter "Qoffset$_{s,n}$" in TS 36.304 [4].

TABLE 5(c)

| Conditional presence | Explanation |
|---|---|
| CSG | This field is optional, need OP, for non-CSG cells, and mandatory for CSG cells. |

<Modifications and Alternatives>

Detailed embodiments have been described above. As those skilled in the art will appreciate, a number of modifications and alternatives can be made to the above embodiments and variations whilst still benefiting from the inventions embodied therein.

In the above embodiments, an essentially mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, the system can be used to provide coverage in a network having one or more fixed computing devices as well as or instead of the mobile communicating devices.

In the embodiments described above, the base stations 5, 7 and mobile communication devices 3 each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base stations or the user communications devices as a signal over a computer network, or on a recording medium. Further, the functionality performed by part or all of this software may be performed using one or more dedicated hardware circuits.

In each embodiment described above, processing of the embodiment may be executed by a program, software, or a computer-readable storage medium that is coded with a computer-executable command. The storage medium includes not only portable recording media such as optical discs, floppy (a trademark) disks, and hard disks, but also networks and other transmission media that record and keep data temporarily.

This invention has been described above by way of the embodiment, but this invention is not limited to the embodiment described above. Various changes that can be understood by a person skilled in the art can be made to the configuration and details of this invention within the scope of this invention. Various other modifications will be apparent to those skilled in the art and will not be described in further detail here.

This application is based upon and claims the benefit of priority from United Kingdom patent application No. 1417245.6, filed on Sep. 30, 2014, the disclosure of which is incorporated herein in its entirety by reference.

The invention claimed is:

1. A home base station for a communication system in which a macro base station operates a macro cell, the home base station comprising:
at least one processor; and
at least one storage, with a memory space, storing executable instructions that when executed by the at least one processor, cause the at least one processor to:
operate a cell located at least partially within the macro cell;
obtain information identifying a quantity of home base stations that each operate at least one respective cell that is located at least partially within the macro cell;
determine resource usage via said home base station;
set a target power for said home base station based on said information identifying quantity of home base stations and said determined resource usage; and
communicate said target power set for said home base station to at least one user communication device, wherein, the at least one processor is further configured to obtain said information from said macro base station that operates said macro cell.

2. The home base station according to claim 1 wherein, the at least one processor is further configured to obtain said information over an X2 interface with said macro base station.

3. The home base station according to claim 2 wherein, the at least one processor is further configured to obtain said information from an X2 Setup Request message received over an X2 interface.

4. The home base station according to claim 3 wherein, the at least one processor is further configured to obtain said information from at least one Neighbour Information information element (IE) in said X2 Setup Request message.

5. The home base station according to claim 4 wherein, the at least one processor is further configured to obtain said information by determining said quantity from respective Neighbour Information for each of a plurality of different base station reported in said X2 Setup Request message.

6. The home base station according to claim 5 wherein, the at least one processor is further configured to distinguish between Neighbour Information for a home base station, and Neighbour Information for a macro base station, in said X2 Setup Request message by reference to a respective global identifier (e.g. a E-UTRAN Cell Global Identifier (ECGI)) provided in the Neighbour Information for each base station whereby to determine said quantity.

7. The home base station according to claim 3 wherein, the at least one processor is further configured to obtain said information from at least one information element (IE) dedicated to reporting said quantity of home base stations.

8. The home base station according to claim 1 wherein, the at least one processor is further configured to obtain said information from system information broadcast by said macro base station.

9. The home base station according to claim 8 wherein, the at least one processor is further configured to obtain said system information provided in a system information block (SIB).

10. The home base station according to claim 9 wherein, said SIB is a SIB type dedicated to providing neighboring cell related information.

11. The home base station according to claim 1 wherein, the at least one processor is further configured to determine uplink resource usage via said home base station.

12. The home base station according to claim 1 wherein, the at least one processor is further configured to determine physical resource block usage via said home base station.

13. The home base station according to claim 1, wherein the at least one processor is further configured to set said target power for said base station further based on at least one of the following:
a target received power at the macro base station;
an internal signal to interference plus noise ratio (SINR) parameter for the home base station;
a measure of a path loss between a user communication device served by the home base station and the macro base station;
a path loss compensation factor for the macro base station;
a measure of a path loss between a user communication device served by the home base station and the home base station; and
a path loss compensation factor for the home base station.

14. The home base station according to claim 1 wherein, said target power set for said base station is an uplink received target power.

15. A home base station for a communication system in which a macro base station operates a macro cell, the home base station comprising:
at least one processor; and
at least one storage, with a memory space, storing executable instructions that when executed by the at least one processor, cause the at least one processor to:
operate a cell located at least partially within the macro cell;
obtain information identifying a quantity of home base stations that each operate at least one respective cell that is located at least partially within the macro cell;
determine resource usage via said home base station;
set a target power for said home base station based on said information identifying a quantity of home base stations and said determined resource usage; and
communicate said target power set for said home base station to at least one user communication device,
wherein, said target power for said home base station is set based on the following equation:

$$P_{o\_H,i} = P_{o\_M} - \Gamma_i + \alpha_M L_{M,i} - \alpha_H L_{H,i} - 10\log_{10}(U_{H,i} N)$$

where $P_{o\_H,i}$ is the target received power at the home base station; $P_{o\_M,i}$ is the target received power at the macro base station; $\Gamma_i$ is an internal signal to interference plus noise ratio (SINR) parameter for the home base station i; $L_{M,i}$, is a measure of the path loss between a user communication device served by that home base station, i, and the macro base station; $\alpha_M$ is a path loss compensation factor for the macro base station; $L_{H,i}$ is a measure of the path loss between the user communication device served by the home base station and the home base station; $\alpha_H$ is a path loss compensation factor for the home base station; $U_{H,i}$ is the measure of the home base station's own individual uplink physical resource block usage; and N is the obtained quantity of home base stations.

16. A method performed by a home base station in a communication system in which a macro base station operates a macro cell, the method comprising:
operating a cell located at least partially within the macro cell;
obtaining information identifying a quantity of home base stations that each operate at least one respective cell that is located at least partially within the macro cell;
determining resource usage via said home base station;
setting a target power for said home base station based on said information identifying a quantity of home base stations and said determined resource usage; and
communicating said target power set for said home base station to at least one user communication device,
wherein, said information is obtained from said macro base station that operates said macro cell.

* * * * *